United States Patent [19]

Wiggins et al.

[11] Patent Number: 4,569,658
[45] Date of Patent: Feb. 11, 1986

[54] TUNNEL OVENS

[75] Inventors: Christopher N. Wiggins, Castle Bytham; Roger H. Wood, Stamford, both of England

[73] Assignee: Baker Perkins Holdings, Plc., Great Britain

[21] Appl. No.: 647,725

[22] Filed: Sep. 6, 1984

[30] Foreign Application Priority Data

Sep. 13, 1983 [GB] United Kingdom ............... 8324514

[51] Int. Cl.⁴ .................. F27D 19/00; F26B 21/06; A23L 3/00; F27B 9/00
[52] U.S. Cl. .................................... 432/47; 34/46; 34/216; 34/217; 99/443 C; 99/473; 99/474; 432/144
[58] Field of Search ............... 432/37, 47, 144, 145; 34/46, 216, 217; 99/443 C, 473, 474

[56] References Cited

U.S. PATENT DOCUMENTS

| | | | |
|---|---|---|---|
| 1,539,230 | 5/1925 | Anderson | 34/46 |
| 2,838,420 | 6/1958 | Valente | 34/216 |
| 3,146,821 | 9/1964 | Wuetig | 432/47 |
| 3,849,904 | 11/1974 | Villalobos | 34/155 |

FOREIGN PATENT DOCUMENTS 281643 10/1928 United Kingdom .
1347241 6/1970 United Kingdom .

Primary Examiner—John J. Camby
Attorney, Agent, or Firm—Steele, Gould & Fried

[57] ABSTRACT

A tunnel oven 20 has a baking chamber divided by partitions 21 into a plurality of longitudinally extending zones 22. The oven heating system comprises upper and lower heater ducts 6a, 6b through which hot gases are passed, using a blower 24 for each zone 22. The intake of each blower 24 is within the associated zone 22 and is disposed adjacent the outlet end of an inlet duct 11 which leads into the lower part of the zone. An outlet 8 leads out of the upper part of each zone 22. The entry end 27 of the inlet duct 11 is open to atmosphere whereby fresh air is introduced into the duct. The exit end of the outlet duct 8 is connected to an exhaust fan 7 whereby gases are extracted from the zone 22 by way of the outlet duct 8 to an exhaust flue 18. Dampers 12 and 10 comprise first and second regulating means for controlling flow through the inlet and outlet ducts 11 and 8. A pair of pressure probes 16, a pressure transducer and controller 17, and a damper-actuator 9 form an arrangement sensitive to unwanted changes of oven pressure within the zone 22 and operable to adjust the damper 10 so as to substantially restore the zonal status quo.

14 Claims, 4 Drawing Figures

TUNNEL OVENS

BACKGROUND TO THE INVENTION

This invention relates to tunnel ovens.

One known form of tunnel oven has its baking chamber divided by partition means into a plurality of longitudinally extending zones, through which an oven conveyor passes in the form of an endless steel mesh band, openings being provided in the partitions to permit the oven band to pass from one zone to the next.

In considering a tunnel oven applied to the baking of biscuits, cereals etc., the length of the oven chamber may be 60 meters divided up into five interconnected zones each 12 meters long. Due to the nature of the product being baked, it is sometimes necessary to maintain the temperature at different levels along the length of the oven, for instance 300° C. in the first zone and 200° C. in the last zone.

Tunnel ovens may be of the direct fired type and employ a plurality of lateral strip burners or distributed hot air heated from a single zonal burner source. Alternatively, the oven may be of the indirect fired type employing, for example, a zonal heat exchanger which transmits heat by radiation or convection.

In tunnel ovens a suction fan may be employed to remove the steam produced from baking. However, air, or oven atmosphere, is also removed along with combustion gases (if a direct fired oven) at the same time. Air or atmosphere so removed is naturally replaced by air flowing into the oven from the feed and discharge ends thereof.

It has been found that this inflowing air may have a bad effect on the baking of the articles due to the comparatively cold indrawn air upsetting the temperature conditions within the baking chamber.

OBJECTS OF THE INVENTION

An object of the present invention is to alleviate this problem, which makes an oven difficult to control and desired temperature and humidity profiles difficult to achieve.

Other problems arise from an excessively high heat requirement from the first (i.e. feed-end) zone and, to a lesser extent, the last (i.e. discharge-end) zone to heat the air passing through to other zones. Furthermore, the necessity, in some cases, of using steam injection at the front end to boost humidity to levels required by the baking process.

A further object of the present invention is to alleviate these additional problems.

SUMMARY OF THE INVENTION

According to the invention, a tunnel oven has a baking chamber divided into a plurality of longitudinally extending zones, an inlet duct leading into each zone, an outlet duct leading out of each zone, means for introducing a controlled flow of fresh air into the inlet duct of a zone, means for extracting gases from the zone by way of the associated outlet duct, first regulating means for controlling flow through the inlet duct, second regulating means for controlling flow through the outlet duct, and means sensitive to unwanted changes of pressure within the zone and operable to adjust one of the first or second regulating means so as to substantially restore the zonal pressure status quo.

As used herein:

the term "gases" applied to all gases present within the zone, including air, steam caused by baking and, in the case of direct-fired ovens, combustion gases.

BRIEF DESCRIPTION OF THE DRAWINGS

An embodiment of the invention will now be described by way of example only, with reference to the accompanying drawings, wherein.

In the figures, like reference numerals refer to like components.

DETAILED DESCRIPTION OF THE PREFERRED EMBODIMENTS

Figure 1:
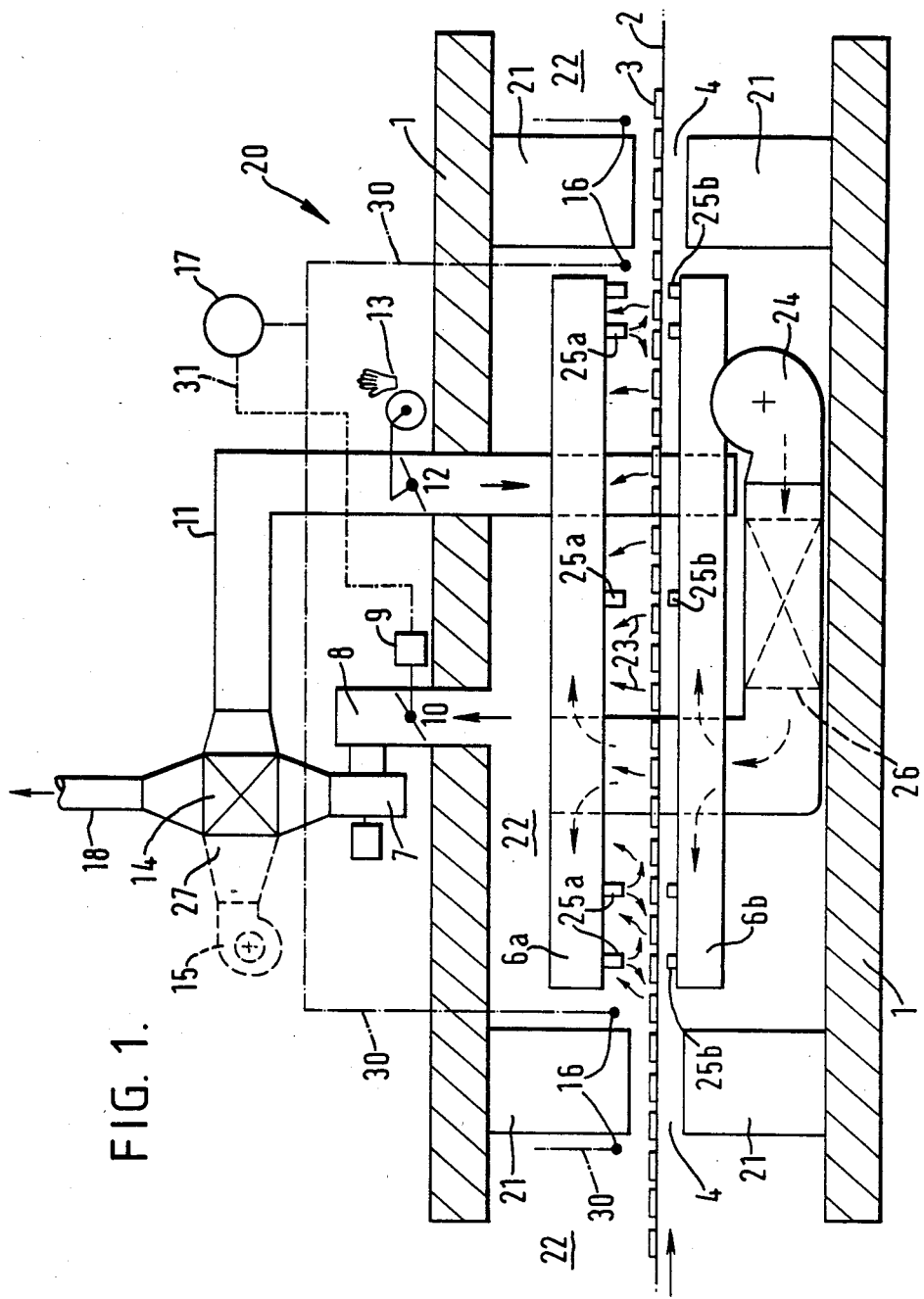
FIG. 1 is a side view, in medial section, of part of a tunnel oven.

With reference to FIG. 1, a tunnel oven 20 has a baking chamber divided by partitions 21 into a plurality of longitudinally extending zones 22. An oven conveyor in the form of an endless band 2 (of, for example, steel mesh), passes through the baking chamber. Openings 4 are provided in the partitions 21 to permit the conveyor band 2 to pass from one zone 22 to the next. The baking chamber of the oven 20 is enclosed in heat-insulation 1.

The tunnel oven 20 may be used for baking biscuits 3. Steam caused by baking the biscuits 3 is represented by the upwardly extending arrows 23. The oven 20 illustrated is indirect fired, i.e. the products of combustion do not enter the baking chamber. The heating system comprises upper and lower heater ducts 6a, 6b through which hot gases are passed, using a blower 24 for each zone 22.

The intake of a blower 24 is within the associated zone 22 and is disposed adjacent the lower or outlet end of an inlet duct 11 which leads into the lower part of the zone 22.

An outlet 8 leads out of the upper part of each zone 22.

The heater ducts 6a, 6b have rows of outlet nozzles 25a, 25b, only a few of which are shown in FIG. 1. A gas or oil-fired heat exchanger 26 is disposed downstream of each blower 24, whereby air discharged by the blower is raised in temperature. The heat exchanger 26 may be replaced should, for example, a direct-fired system be used, (i.e. a system wherein the products of combustion enter the baking chamber), such a system employing oil or gas-fired burners.

The entry end 27 of each inlet duct 11 is open to atmosphere whereby fresh air is introduced into the duct. The exit end of the outlet duct 8 is connected to an exhaust fan 7 whereby gases are extracted from a zone 22 by way of the outlet duct 8 to an exhaust flue 18. Damper means 12 and 10 provide, respectively, first and second regulating means for controlling flow through the inlet and outlet ducts 11 and 8. A pair of pressure-sensing probes 16, a pressure transducer and controller 17, and a damper-actuator 9 form means sensitive to unwanted (pressure) changes of oven atmosphere within the zone 22 and operable to adjust the damper 10 so as to substantially restore the zonal status quo.

One pressure probe 16 is disposed at or adjacent one end of each zone 22. The other probe 16 is dispoesd at the opposite end of the zone.

The damper 12 (in this example) is manually operated at a control station 13.

The exhaust fan 7 discharges to the exhaust flue 18. A heat exchanger 14 is disposed in the exhaust flue 18 whereby fresh air entering the inlet duct 11 is preheated. This use of waste heat present in the exhaust gases, in order to raise the temperature of the inflowing air, increases the operating efficiency of the oven 20 substantially, for example, by 20%.

In operation, unwanted changes of pressure within each zone 22 is sensed by the probes 16 therein. Signals corresponding to the changes of pressure are transmitted along lines 30 to the controller 17. The controller then adjusts the damper 10, by way of signals transmitted along a signal line 31, so as to substantially restore the zonal (pressure) status quo.

Alternatively, a damper 12 may be adjusted by employment of an actuator as does damper 10. (See FIG. 2 where a damper 12 is adjusted by an actuator 13). However, control of damper 10, i.e. control of outflow from an oven zone, is preferred.

In one modification of the oven 20, a fan 15 is connected to the entry end 27 of the inlet duct 11, so as to introduce fresh air into the duct.

In another modification, alternatively, or in addition to the pressure-sensitive probes 16, means sensitive to flow through each zone 22 are provided, the means signalling gas flow changes to transducer controller 17.

The invention allows fresh air supplied to and extraction of gases from each zone 22 to be varied so as to compensate for the varying rates of steam generation which occur along the baking chamber.

Figure 2:
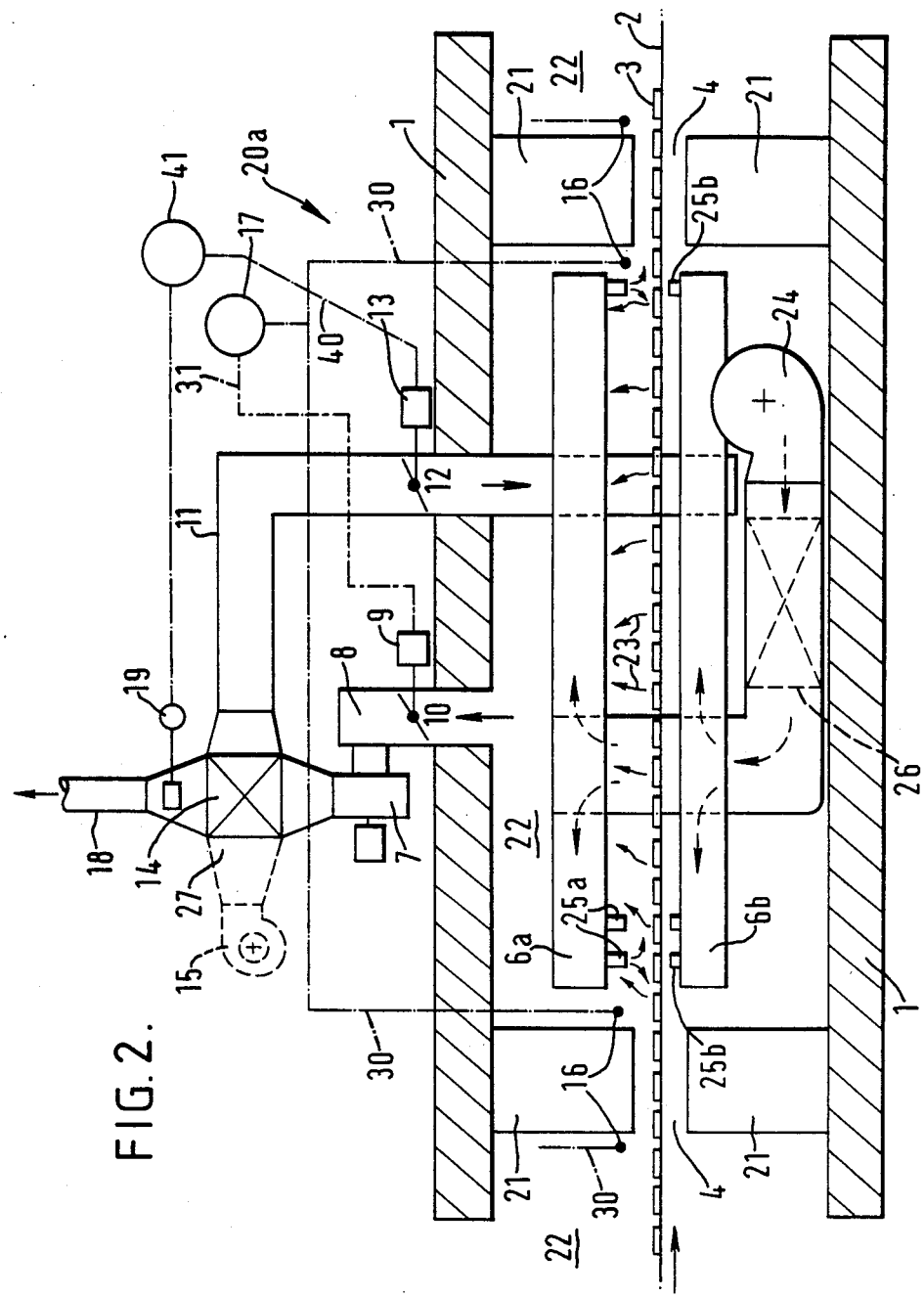
FIG. 2 is a similar view, and illustrates a modification of the FIG. 1 arrangement.

With reference now to FIG. 2, the oven 20a illustrated thereby differs from the oven 20 of FIG. 1 in that zonal humidity as well as pressure is now controlled.

As shown in FIG. 2, damper 12 is now adjustable by means of an actuator 13, which is under the control, by way of signal line 40, of a controller 41. A humidity probe 19 senses unwanted changes in humidity within each exhaust flue 18, (which changes correspond to humidity changes in the associated zone 22), and emits signals to controller 41 accordingly.

This modification enables a zone 22 to be operated at differing humidity levels. By employing the sensor 19 to sense humidity changes in the exhaust gas stream passing along the flue 18, a substantial measure of humidity control is achieved.

Hitherto, in tunnel oven operations, baking chamber extraction settings have been established by trial and error with little or no regard for efficiency of energy usage. The common belief is that extraction should be relatively small at the front or entry end of the oven to build up humidity levels and relatively large up towards the centre and back or exit end in order to promote quicker removal of moisture. This difference in extraction tends to promote drift of oven atmosphere from the front to the back of the oven. This drift tends to exaggerate zonal interaction, i.e. interflow of heat and/or gases which also leads to inefficient usage of energy.

The flow of fresh air entering the front end of an oven, resulting from the oven atmosphere drift referred to, works against a desire for high humidity in this area, and, without additional steam injection, a typical humidity profile along an oven will always have a steeply rising characteristic towards a central point in the baking chamber and then a falling one towards the back end of the oven. The product being baked and/or the rate of evaporation, will determine the peak value of humidity and its position in the baking chamber. Typical peak values are 0.5 for crackers and 0.3 for hard sweet or soft doughs and these humidities are expressed as a ratio of the mass of water vapour present with a given mass of dry air.

The average operating humidity for a tunnel oven is approximately 50% of the peak. This tends to determine the total volume of fresh air used in oven operation, which is a major contributory factor towards inefficient energy usage. Recent studies have shown that the proportion of heat supplied for heating this fresh air can be as high as 40%. Hence it is feasible that savings in excess of the 20% mentioned above could be achieved by the application of zonal control and the use of pre-heated fresh air.

The efficiency of the control systems described herein depends on oven atmosphere pressure or flow signals obtained during oven operation. Tests indicate that to promote any flow of air into a tunnel oven, the oven needs to be under a slight negative pressure. This negative pressure is a measurable quantity and can vary in value, for example, from $-1.0$ Pa to $-10.0$ Pa depending on zonal extraction setting, and extraction position. (See FIG. 4).

Tests also indicate that it is characteristic for a pressure gradient to exist in a tunnel oven which would peak at the point of maximum extraction. The pressure differences found between zones emphasises the occurrence of air flow and hence zonal interaction within the baking chamber.

In the examples illustrated, the zonal integrity control systems will preferably maintain substantially the same constant pressure in all zones. This pressure will be a slightly negative value, preferably in the range $-0.2$ Pa to $-1.0$ Pa.

Further benefits in operating efficiency will be realised from operating the oven 20a, when the oven is allowed to "idle" or is kept in a hot condition during production breaks. The loss of product steam is sensed by the humidity sensors 19 followed by closure, or partial closure, (as in the case of direct-fired ovens), of the exhaust dampers 10. Pressure balance is maintained by closure, or partial closure, (as in the case of direct-fired ovens), of the inlet air dampers 12. This reduces substantially the flow of fresh air passing through the oven during idling periods which would effectively reduce energy consumption.

Figure 3:
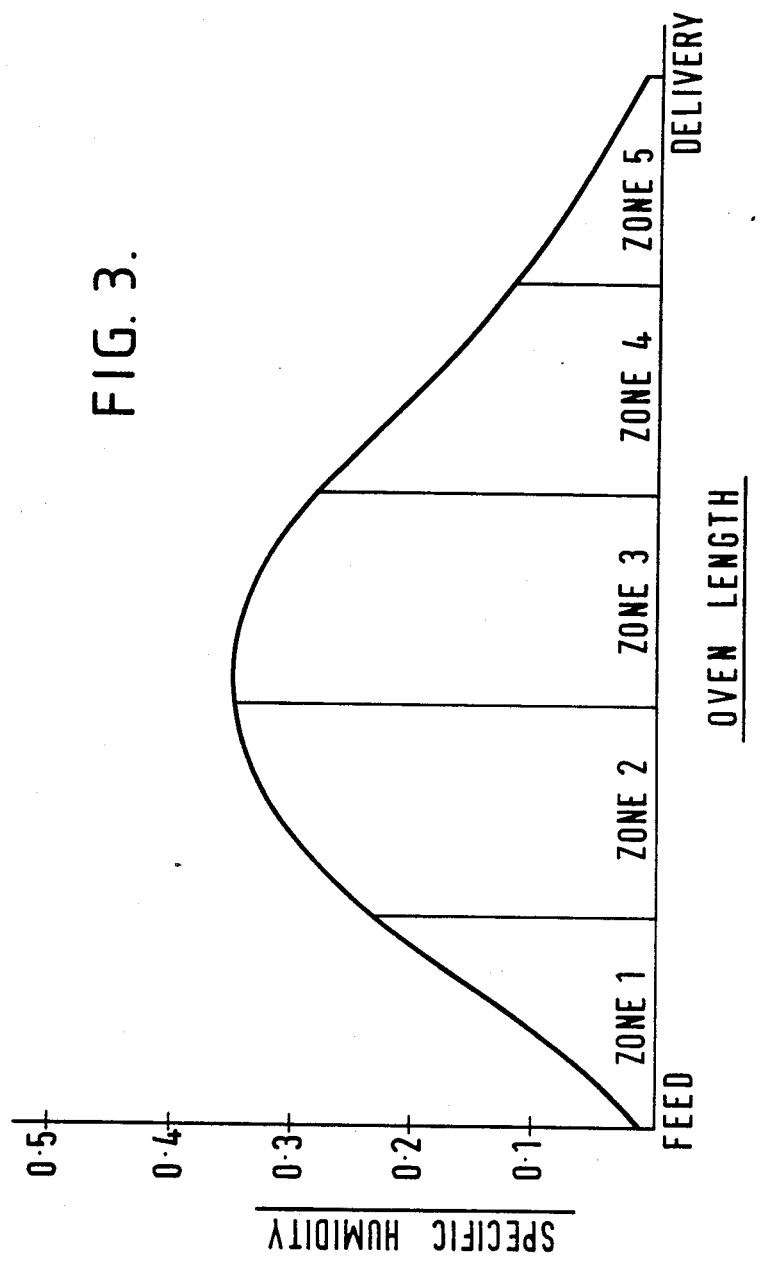
FIGS. 3 and 4 are graphs which illustrate, respectively, oven humidity and oven pressure profiles.
Figure 4:
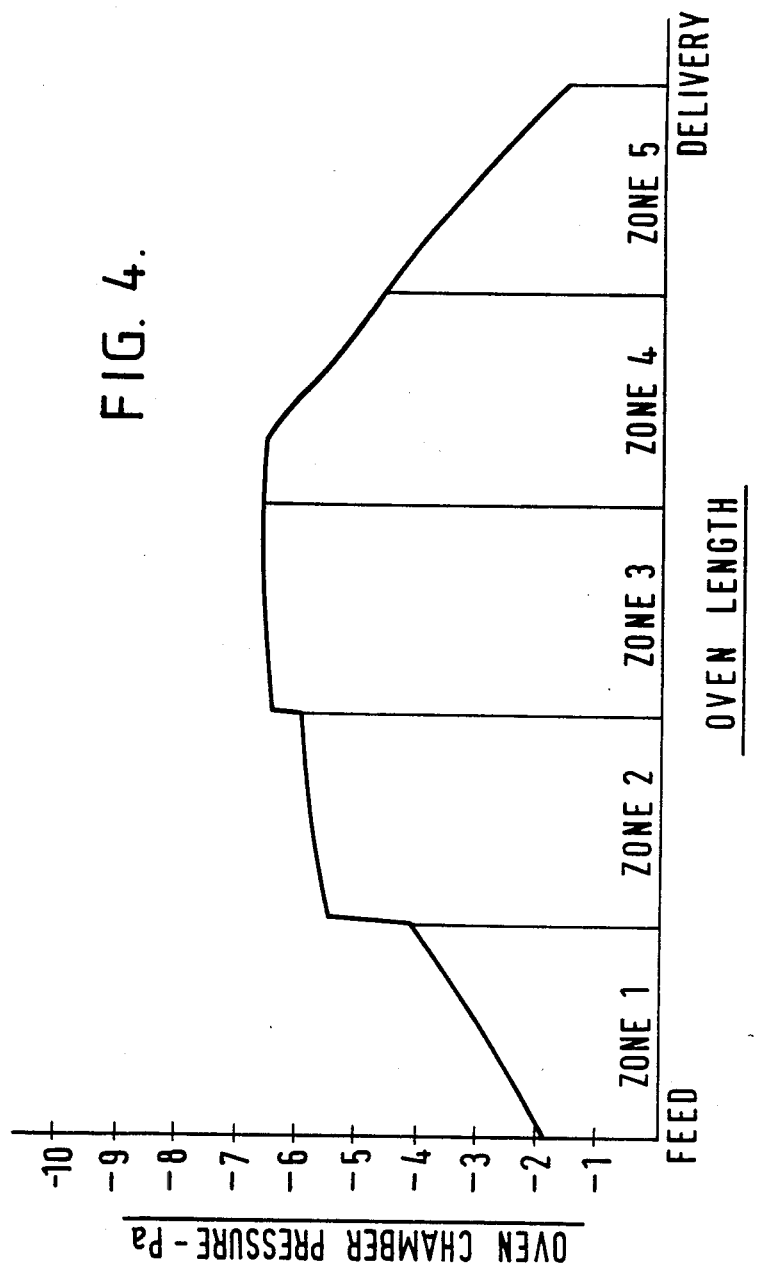

FIGS. 3 and 4 are graphs relating the typical five-zone ovens. FIG. 3 shows an example of an oven chamber humidity profile and FIG. 4 an example of an oven chamber pressure profile.

We claim:
1. A tunnel oven, comprising:
a baking chamber divided into a plurality of longitudinally extending zones;
an inlet duct leading into each zone;
an outlet duct leading out of each zone;
means for introducing a controlled flow of fresh air into the inlet duct of a zone;
means for extracting gases from the zone by way of the associated outlet duct;
first regulating means for controlling flow through the inlet duct;
second regulating means for controlling flow through the outlet duct; and,
means sensitive to unwanted changes of pressure within the zone and operable to adjust one of the first and second regulating means so as to substantially restore the zonal pressure status quo.

2. A tunnel oven as claimed in claim 1, wherein the means sensitive to unwanted changes of atmosphere within the zone comprise pressure-sensing means, operable to adjust said second regulating means.

3. A tunnel oven as claimed in claim 1, wherein, in addition to the means sensitive to unwanted changes of pressure within the zone, the oven further comprises means sensitive to unwanted changes in humidity within said zone.

4. A tunnel oven as claimed in claim 1, comprising means for pre-heating the flow of fresh air into the inlet duct of the zone.

5. A tunnel oven as claimed in claim 4, wherein the fresh air pre-heating means make use of waste heat present in gases extracted from the zone by way of the outlet duct.

6. A tunnel oven as claimed in claim 1, comprising fan means for introducing a controlled flow of fresh air into the inlet duct.

7. A tunnel oven as claimed in claim 1, comprising fan means for extracting gases from the zone.

8. A tunnel oven as claimed in claim 1, comprising indirect firing heating means.

9. A tunnel oven, comprising:
 a baking chamber divided into a plurality of longitudinally extending zones;
 an inlet duct leading into each zone;
 an outlet duct leading out of each zone;
 means for introducing a controlled flow of fresh air into the inlet duct of a zone;
 means for extracting gases from the zone by way of the associated outlet duct;
 first regulating means for controlling flow through the inlet duct;
 second regulating means for controlling flow through the outlet duct;
 means sensitive to unwanted changes of pressure within the zone and operable to adjust one of the first and second regulating means so as to substantially restore the zonal pressure status quo; and,
 means sensitive to unwanted changes in humidity within said zone and operable to adjust one of the first and second regulating means so as to substantially restore the zonal humidity status quo.

10. A tunnel oven as claimed in claim 9, comprising means for pre-heating the flow of fresh air into the inlet duct of the zone.

11. A tunnel oven as claimed in claim 10, wherein the fresh air pre-heating means make use of waste heat present in gases extracted from the zone by way of the outlet duct.

12. A tunnel oven as claimed in claim 9, comprising fan means for introducing a controlled flow of fresh air into the inlet duct.

13. A tunnel oven as claimed in claim 9, comprising fan means for extracting gases from the zone.

14. A tunnel oven as claimed in claim 9, comprising indirect firing heating means.

* * * * *